United States Patent [19]

Moan

[11] 4,016,860

[45] Apr. 12, 1977

[54] TUBULAR SOLAR ENERGY COLLECTION SYSTEM UTILIZING AIR MEDIA

[75] Inventor: Kenneth L. Moan, Toledo, Ohio

[73] Assignee: Owens-Illinois, Inc., Toledo, Ohio

[22] Filed: Jan. 12, 1976

[21] Appl. No.: 648,355

[52] U.S. Cl. .............................. 126/270; 126/271
[51] Int. Cl.$^2$ .......................................... F24J 3/02
[58] Field of Search ........................... 126/270, 271

[56] References Cited

UNITED STATES PATENTS

| | | | |
|---|---|---|---|
| 980,505 | 1/1911 | Emmet | 126/271 |
| 2,205,378 | 6/1940 | Abbot | 126/271 |
| 2,247,830 | 7/1941 | Abbot | 126/271 |
| 2,872,915 | 2/1959 | Bowen | 126/271 |
| 3,227,153 | 1/1966 | Godel et al. | 126/271 |
| 3,952,724 | 4/1976 | Pei | 126/271 |
| 3,960,136 | 6/1976 | Moan et al. | 126/271 |

FOREIGN PATENTS OR APPLICATIONS 472,427 12/1950 Italy .................................. 126/271

Primary Examiner—William R. Cline
Assistant Examiner—H. Jay Spiegel
Attorney, Agent, or Firm—J. R. Nelson

[57] ABSTRACT

An air system for the collection and utilization of solar energy. Tubular solar collectors are made with a transparent glass tube having a cylindrical outer wall, spaced and sealed at one end to a cylindrical absorber tube that has a solar energy absorbing surface. The sealed space between the glass tube and absorber tube is evacuated. Several of the collectors are connected into a manifold split into separate chambers by a dividing wall. A divider strip is fastened as a continuation of the dividing wall of the manifold by a novel detachable fastener means. The divider strip fits snugly inside the absorber tube of each collector dividing it in half and spanning nearly the entire length thereof. Pressurized air is supplied into the one high pressure chamber of the manifold and is connected into the one half section of the absorber of each collector at the open end connection, guided by the dividing strip the length of the absorber tube into the other half of the absorber tube and back into the other compartment of the manifold which is at lower pressure. The reverse flow of air the length of the absorber tube exchanges solar heat absorbed on the solar energy absorbing surface. Heated air in the lower pressure chamber is conveyed to a heat exchange storage element and/or load device operable for heating or cooling purposes.

21 Claims, 10 Drawing Figures

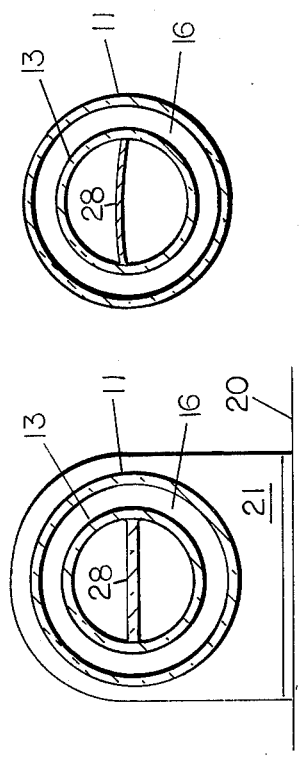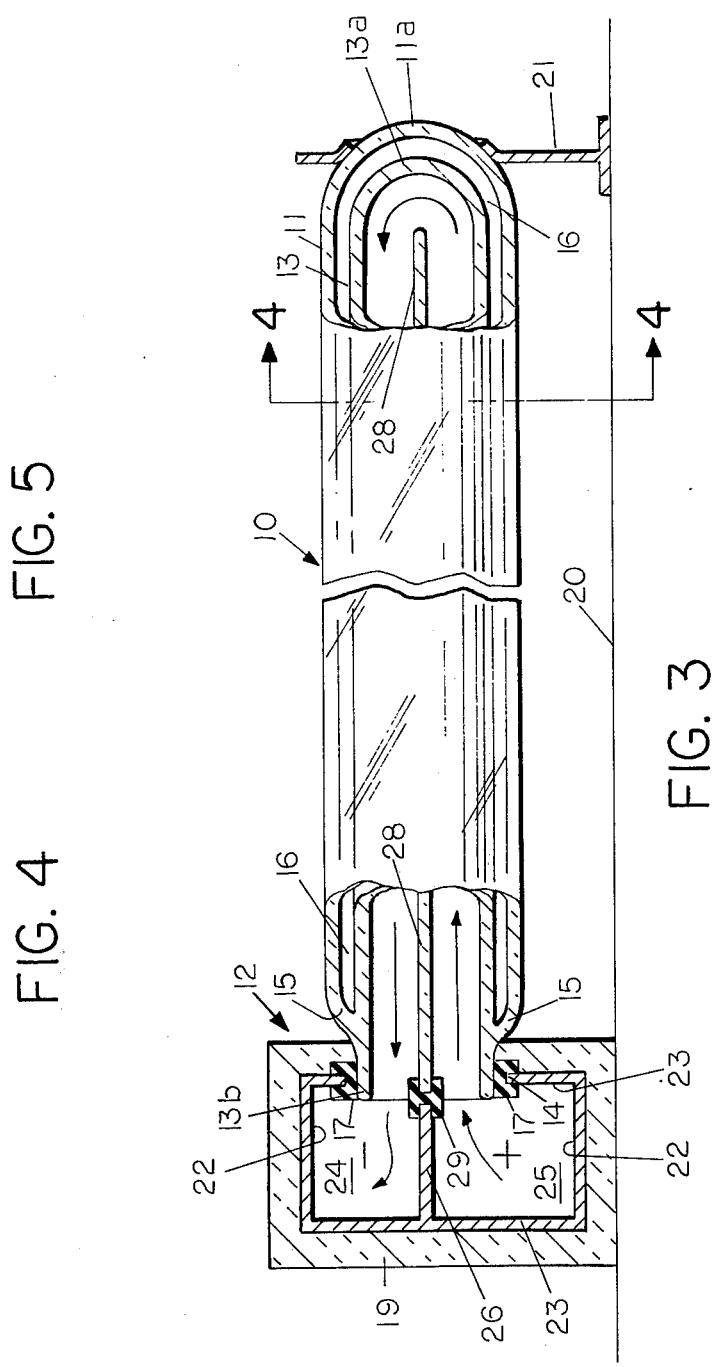

TUBULAR SOLAR ENERGY COLLECTION SYSTEM UTILIZING AIR MEDIA

The present invention relates to a solar energy collector of the tubular type in which a working fluid, such as air, is circulated through the tubes from and to a manifold exchanging heat absorbed by the collector's tubular hollow absorber member.

The tubular type of collector is exemplified in the copending application of Y. K. Pei, Ser. No. 482,092 now U.S. Pat. No. 3,952,724 filed June 24, 1974 and is owned by the assignee of this application. To achieve a heat exchange with the energy collected on the absorber surface of the collector, working fluid, heretofore a liquid, is conducted in a reverse flow through the length of the collector entering the open end, flowing to near the closed end and back through the open end. This is dictated by the access to the absorber tube from only one end thereof.

The present invention has for its object the use of a gas, e.g. air, as a working fluid medium whereby the gas is circulated over the absorber surface of the collector and energy is exchanged from the absorber tube surface to heat the gas. Within the definition of working fluid, particles may be entrained in the air to increase the heat capacity of the transfer fluid.

Another object of the invention is to provide a simple structure in conjunction with the tubular collector for circulation of the gas in the manner described.

SUMMARY OF THE INVENTION

The apparatus of the invention incorporates a divider strip interiorly of the absorber tube of the collector which fits snugly across the internal diameter of this cylindrical element. The strip may be of a variety of materials, for example, metal, corrugated board, plastic or wood, depending on the operating temperature of the collector. The absorber tube is fitted by a gasket seal into a manifold divided into high and low pressure compartments, and the divider strip in each of the collector tubes is grommet connected at the manifold to avoid short circuiting of the gas (or leakage) from the high pressure to the low pressure zones of the system. The manifold is of simplified box structure. The manifold may designed to accomodate a series of collectors depending from one side of the manifold, or depending from opposite sides thereof.

The invention also provides a suitable, detachable mounting for the divider strip in each collector onto the manifold so as to separate the incoming from outgoing gas flow in the collector.

The gas (air) system has the advantage of much less weight. Flat plate collectors are almost universally run with a liquid working fluid, e.g. water. The amount and weight of the water on the supporting structure (usually the roof of a building) at any time is substantial. Secondly, in winter or cold seasons after the sun has set, the water must be drained from the collector and exposure to freezing temperatures. As an alternative, ethylene glycol may be used to avoid freezing, but any leak in the system at any time would prove costly. The use of gas as the working fluid in the system overcomes such problems and for relatively low ambient temperature operation is deemed desirable.

BRIEF DESCRIPTION OF THE DRAWINGS

FIG. 3 is a sectional end elevational view taken through the manifold, and represents one embodiment of the invention.

FIG. 4 is a sectional view taken along line 4—4 on FIG. 3, showing a first form of the assembled tube dividing strip in cross section.

FIG. 5 is a sectional view similar to FIG. 4 showing a second form of the assembled tube dividing strip.

DETAILED DESCRIPTION

Figure 6:
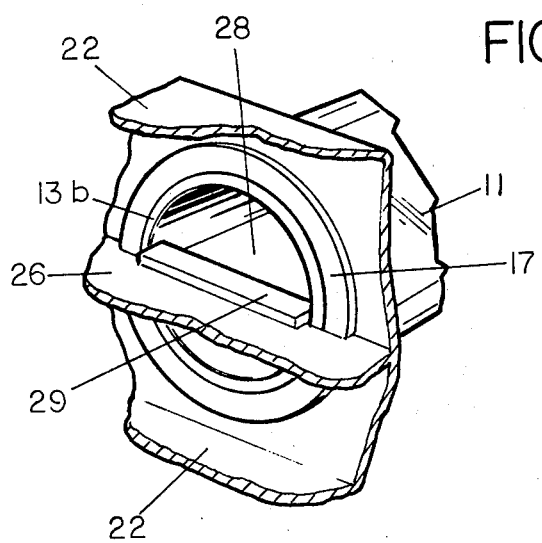
FIG. 6 is a perspective view, broken away, showing the means for detachably connecting the tube dividing strip onto the manifold.
Figure 7:
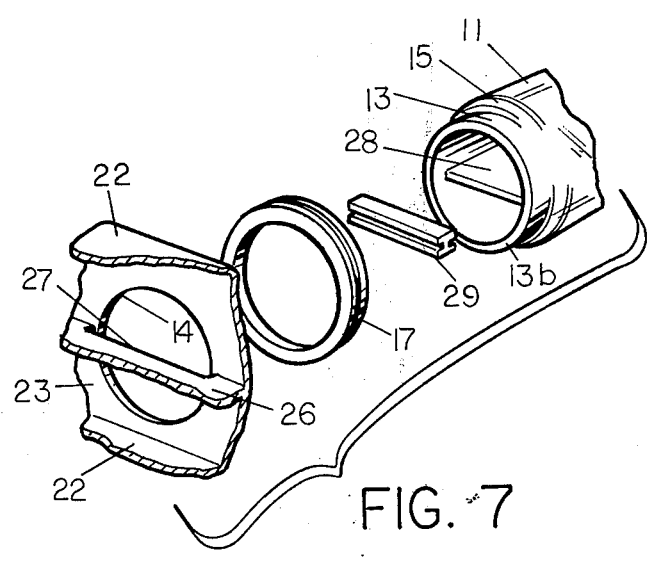
FIG. 7 is an exploded perspective view illustrating the parts and assembly of the subject matter of FIG. 6.

As illustrated on FIG. 3, tubular solar collectors 10 are made with a transparent glass outer tube 11 having a closed end 11a remote from the manifold 12 and an open end ajacent the manifold. Inside of tube 11 there is a tubular absorber member 13 comprised of a glass tube having a closed end 13a remote from the manifold and an open end 13b connected with an aperture 14 in the manifold. The outer surface 13c of the absorber member 13 is a solar energy absorbing surface extending between the ends 13a and 13b. Preferably, the absorbing surface 13c comprises an overall wave length selective coating having high absorptance and low emittance; for example, one having 0.8 or greater absorptance and 0.1 or lower infra red emittance. The selective coating is made by way of one example by the vacuum deposition of a thin layer (1000 A) of aluminum on the glass absorber tube's outer surface. Chromium is then electrically vaporized and deposited over the aluminum substrate as black chrome to a thickness of about 1500 A. Alternatively, the surface 13c may be blackened as an energy absorbing coating with an overcoating of an infra red energy trapping material such as magnesium oxide, magnesium fluride, etc. The absorber member 13 is sealed along the wall to the outer tube 11 by a glass-to-glass seal at the open end of the outer tube, such as by fusion at 15 of the glass of the outer tube onto the wall of the inner glass absorber tube. The tubes 11 and 13 are, of course, of differing sizes (diameter) such that a space 16 is provided therebetween. The space 16, after the end wall sealing at 15, is evacuated to a hard vacuum, on the order of $10^{-4}$ torr. The vacuum is pumped off at the tip end of the outer tube and a tubulation thereat sealed off (not shown), which is a known expedient for evacuation of space 16. The vacuum in space 16 will reduce, in fact, substantially eliminate, conduction and convection losses from the collector. The open end of the absorber tube, at 13b, is in sealing engagement with an opening 14 in the manifold in a gasket 17, which in the version shown on the drawings (FIGS. 6 and 7 in particular) comprises a grommet style of gasked molded from a silicon rubber compound.

In general terms, the tubes 11 and 13 form a double-wall tubular member having a closed end remote from the manifold 12 and an open end in sealing engagement with the manifold 12. The solar collectors 10, in their preferred form, are entirely transparent at the outer wall (tube 11) and entirely or overall coated on the outer surface of the inner wall with the wave length selectively absorbing coating. The tubular collectors 10 are preferably mounted on the manifold 12 so as to be in a spaced relation from a diffuse reflecting background surface, indicated at 20 on FIG. 3, and interposed between surface 20 and the solar radiation a prescribed amount for most efficient absorption of the solar radiation. The outer tube 11 being entirely transparent permits reflected as well as direct radiation of the solar rays to strike the inner absorbing surface 13c of the collector. The spacing of the collectors 10 from the plane of surface 20 may be established by the end support bracket 21 which receives and supports the outer closed end 11a of the tubular collector 10.

The manifold structure 12 may take different construction forms. A first form is shown on FIGS. 1 and 9, wherein an elongated duct is comprised of metal top and bottom walls 22 and opposite side walls 23. The apertures or openings 14 for receiving the tubular collectors are provided in an aligned, spaced arrangement along both the side walls 23. The duct of the manifold is divided into two longitudinal over-and-under chambers 24 and 25 by a central wall 26. As may best be seen on FIG. 7, this central wall is stepped or recessed at 27 opposite the aperture 14 in the walls 23 to accomodate the tubular collectors. Otherwise, the central wall 26 extends from one side wall 23 to the other and seals off chamber 24 from chamber 25.

The novel assembly of the invention includes the central dividing strip or web 28. The width of strip 28 is preferably slightly oversize of the internal diameter of the absorber tube 13 such that a friction tight fit of strip 28 inside tube 13 is provided. The strip 28 may be made of relatively flexible material such that when it is inserted inside of tube 13, it takes a slight bow. (See FIG. 5). Strip 28 is slightly shorter in length than the axial length of tube 13 and when assembled, as shown on FIG. 3, there is a space between the inner end of strip 28 and the closed end wall of the absorber tube at 13a.

With the strip 28 in place, the tubular collector 10 is inserted into the manifold aperture and the end of strip 28 at the open end 13b of the absorber tube is connected to the central dividing wall 26 of the manifold by a rubber grommet bar 29. The grommet 29 is molded of silicon rubber, for example, having oppositely facing notches to receive the plate of wall 26 and the strip 28 therein and seal off the chambers 24 and 25 at the connection point.

Figure 2:
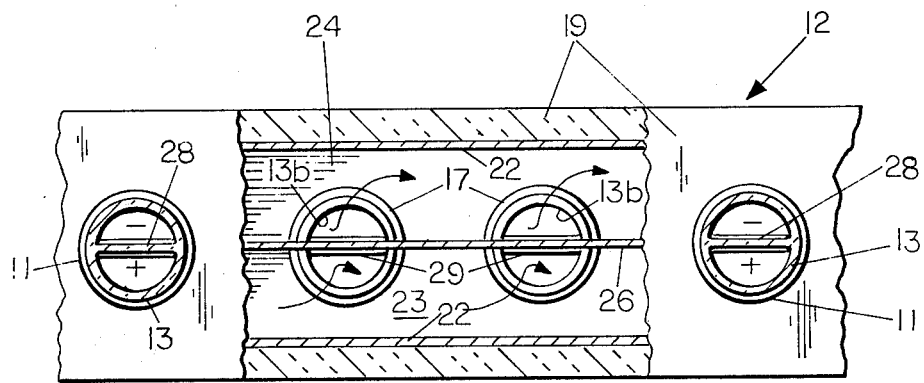
FIG. 2 is a sectional longitudinal elevational view taken along line 2—2 on FIG. 1.
Figure 8:
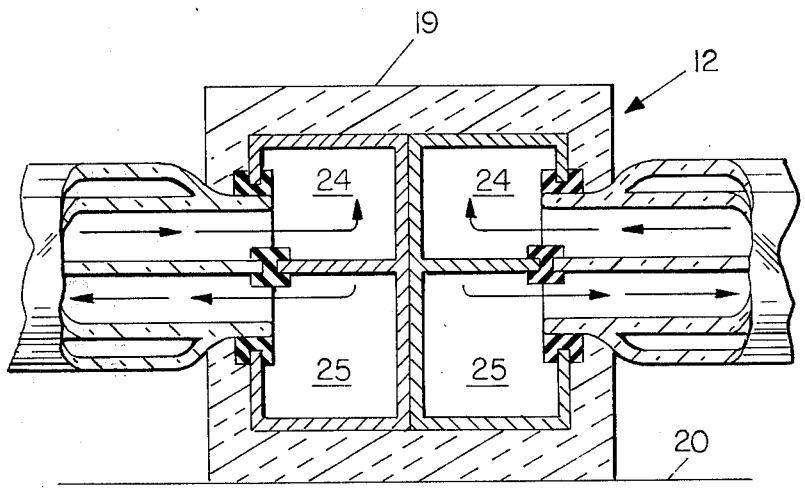
FIG. 8 is an end sectional view of another embodiment of the invention, wherein the manifold and collectors shown on FIG. 3 are assembled in tandem in a back-to-back configuration.

The manifold 12 may be constructed as a single side collecting unit in which the tubular collectors 10 depend from one side wall 23 only of the manifold duct. This form is shown on FIG. 3. A double side collecting unit comprised of the manifold duct of another type is shown on FIG. 9 (also, FIG. 2 relates thereto) in which the tubular collectors 10 depend from apertures in the opposite side walls 23 of the manifold. A third structure is shown on FIG. 8 in which, in effect, two of the units of FIG. 3 are placed back-to-back. The assembly of the collectors and dividing strip therein is similar in either case.

The dividing strip 28 in the collectors 10 may be made of metal, corrugated paper board, plastic or wood. The preferred material is metal, such as thin gauge aluminum or copper sheet. The choice of material for the dividing strip 28 will, of course, depend upon the temperature conditions in the collector during operation.

The manifold ducts 22, 23 are insulated by encasing them, except for the apertures 14 for assembly of the collectors 10, with a jacket 19 of a moldable cellular, polymeric insulation material. The exterior surface of the insulation jacket 19 should be protected by a sealant such as an outer layer of a paint, plastic or polymer. A preferable insulation jacket 19 construction is a moldable foamed polyurethane material of a bulk density of about 8 lb. per cubic foot, or less.

Figure 1:
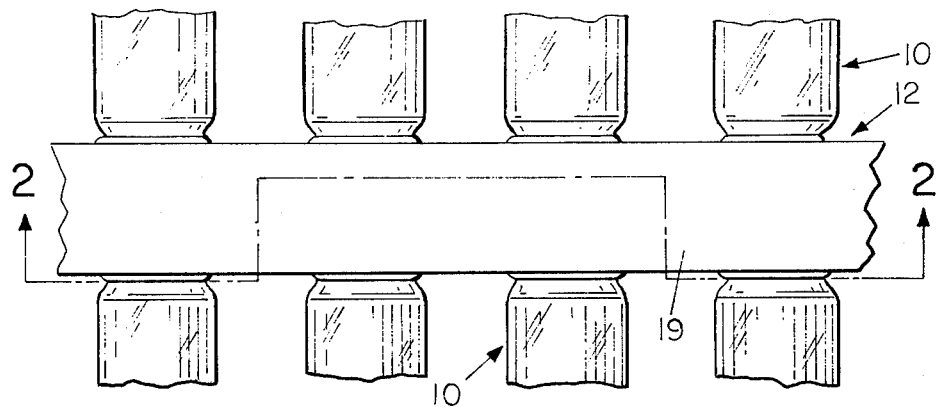
FIG. 1 is a plan view, partly broken away, showing the tubular solar energy collector incorporating the invention.
Figure 9:
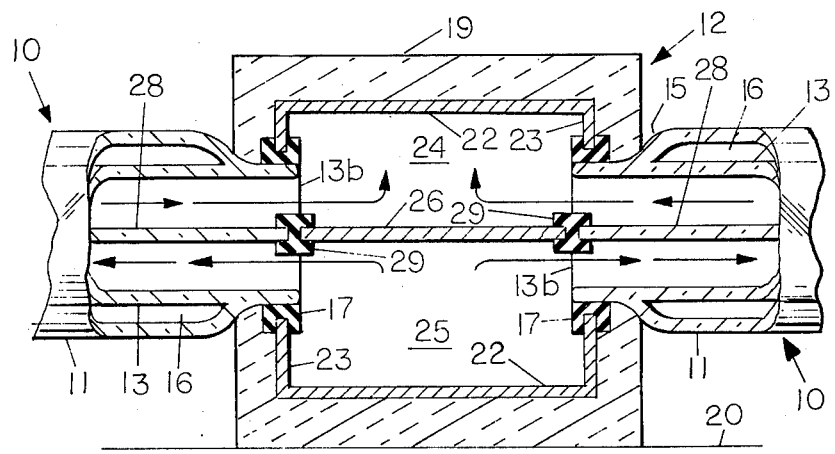
FIG. 9 is an end sectional view of still another embodiment of the invention in which tubular collectors depend from the opposite sides of a single manifold.

In another form, the manifold may be made in a mold from a polyurethane foamed in place in the mold or similar polymer of cellular consistency omitting the metal walls and parts shown on FIGS. 1 and 9. The exposed air carrying surfaces of the manifold, as well as the exposed exterior surfaces of the molded plastic manifold are coated with a layer of a plastic or polymer to seal the foamed plastic insulation.

Figure 10:
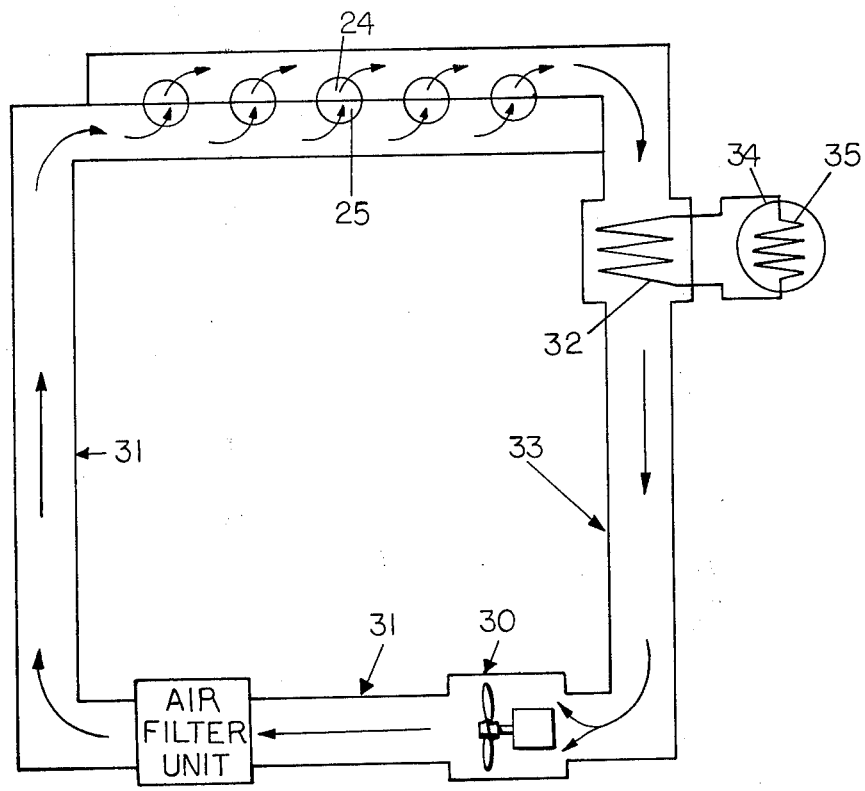
FIG. 10 is a schematic view of a solar energy heating air system utilizing the present invention.

The operation of the solar energy collectors of this invention is illustrated schematically on FIG. 10. The gas media, in the example given, air, is forced by fan 30 into high pressure ducts 31 through an air filtering unit and into the high pressure chamber 25 of the manifold 12. The air flow will dead-end at the one end of chamber 25; therefore, flow is forced into the open end 13b of the absorber tube at the underside of the internal dividing strip 28 therein. The air flow is according to the arrows on FIG. 3. The air flow across the interior surface of absorber member 13 is heated by the exchange of heat energy from the absorber surface. The heated air exits absorber tube 13 into the upper chamber 24 on the low pressure duct 33 over coils 32 and to the inlet of fan 30. The heat exchanger coils 32 are a part of a load device in the system. The high pressure and low pressure sides of the duct are also indicated (FIGS. 2 and 3) + and − respectively. Coils 32 are in a closed system with a load device, such as a water heater 34 and the heat exchange coils 35 therein. The fluid in the system is heated at the coils 32 by the hot air and this heat is circulated and exchanged to the load (water in tank 34) at the coils 34. The air passes beyond the coils 32 and enters fan 30 for recirculation.

The present invention provides a simplified gas system in a solar energy device. The tubular collectors, by their nature wherein they are open only at one end, are provided with reverse flow of gas entering the open end to the closed end and back. The reverse flow is defined by the simple divider strip insertible into the cylindrical segment of the absorber tube. Leakage of gas flow and short circuiting from high to low pressure sides of the collector is avoided by the grommet seals at the divider strip. The manifold is of simplified box or duct structure properly insulated against convection and radiation heat losses. This construction avoids more complex apparatus for gas flow in the absorber tube, such as a third glass tube, and the pressure drop created in this style of gas delivery into the absorber tube. Costly double gasketing of the delivery tube is also obviated.

The preferred example of the gas selected for the working fluid media is air principally by reason of its cost. However, other gases may be selected for their specific heat properties, or the like, in a particular installation or application of the invention. As mentioned herein, particles may be entrained in the air to increase the heat capacity of the working fluid in the system.

While only certain specific embodiments and details of the invention have been described for illustrative purposes, it is evident that various changes and modifications may be made therein without departing from the spirit of the invention. In the appended claims, it is intended that all changes and modifications for those described incidental to the spirit of the invention are to be included as a part of the invention.

Accordingly, the following is claimed as the invention:

1. A solar energy collection apparatus comprising
a manifold having exterior wall means and a central internal wall means dividing it into separate first and second compartments,
aperture means in said exterior wall means communicating with said first and second compartments and extending across said central wall means,
at least one elongated solar collector having a closed end and an open end comprised of an outer glass tube closed at its one end and an inner tube of lesser O.D. than the I.D. of said outer tube and closed at its one end, there being a space between the inner and outer tubes, a peripheral surface of the inner tube comprising an energy absorbing surface extending substantially the length of the inner tube, the outer and inner tubes being integrally joined together adjacent their other ends opposite said closed ends sealing the space therebetween, said space being evacuated to subatmospheric pressure,
means sealing the solar collector in the aperture of the manifold, the open end of said solar collector communicating with both said first and second compartments of the manifold and extending across said central wall means,
elongated web means disposed internally of said inner tube of the solar collector, and substantially in registry with said central wall means of the manifold,
means sealingly connecting the end of said web means adjacent the aperture to the central wall means, thereby connecting the first and second compartments of the manifold into the inner tube of the solar collector, the other opposite end of said web means extending axially into the inner tube and spaced from the closed end of the latter, whereby the first and second compartments of the manifold are connected to each other in the inner tube of the solar collector near the closed end thereof,
a gas filling both compartments of said manifold, and the inner tube of said solar collector, and
means for propelling said gas in said manifold from one compartment thereof through the solar collector from its other end to its one end and return and into the other compartment of the manifold.

2. The solar energy collection apparatus of claim 1 wherein the inner tube of the solar collector is glass and includes over the outer peripheral surface thereof a wave length selective coating having high absorptance and low emittance.

3. The solar energy collection apparatus of claim 2, wherein said selective coating is comprised of a thin layer of aluminum on the glass surface and a layer of chromium as black chromium deposited over the aluminum layer.

4. The solar energy collection apparatus of claim 2 wherein the wave length selective coating is characterized by properties of absorptance of 0.8 or greater and infra red emittance of 0.1 or lower.

5. The solar energy collection apparatus of claim 1 wherein the gas comprises air.

6. The solar energy collection apparatus of claim 1 which includes a closed path flow conduit extending from said other compartment of the manifold to said one compartment thereof and a heat exchanger in said flow conduit.

7. The solar energy collection apparatus of claim 1, wherein the means sealing the collector in the manifold aperture means comprises a grommet gasket of resilient material engaging the manifold wall means about the aperture therein and sealingly engaging the wall of the solar collector inserted therein.

8. The solar energy collection apparatus of claim 1, wherein the web means extends axially adjacent the open end of the solar collector and said connecting means comprises a grommet bar having oppositely facing seal grooves, one of said grooves gripping the central wall means of the manifold, thereby detachably connecting the web means to the manifold, thereby detachably connecting the web means to the manifold central wall and sealingly connecting the one compartment with the other only through the inner tube of the tubular solar collector.

9. The solar energy collection apparatus of claim 8, wherein the web comprises a relatively flexible, thin, planar elongated member having a width dimension that is slightly greater than the I.D. of the inner tube, the planar member when inserted axially into said inner tube is bowed in a spring-like fashion bearing at its longitudinal edges onto the inner wall surface of the inner tube for a firm seal of the member in dividing the tube into a reversing flow path for the gas.

10. The solar energy collection apparatus of claim 9, wherein said elongated member is a planar metal strip.

11. The solar energy collection apparatus of claim 9, wherein said elongated member is a planar strip of a fibrous, cellulose material.

12. The solar energy collection apparatus of claim 9, wherein said elongated member is a planar strip of a plastic material.

13. The solar energy collection apparatus of claim 1, wherein the manifold includes an external covering of a cellular insulation material.

14. The solar energy collection apparatus of claim 13, wherein the cellular insulation material is an organic plastic.

15. The solar energy collection apparatus of claim 14, wherein the cellular organic plastic insulation is foamed polyurethane.

16. A solar energy collection apparatus comprising
an elongated hollow manifold having exterior side wall means and a longitudinal internal wall dividing the manifold into first and second compartments,
aperture means spaced longitudinally along said exterior wall means communicating with said first and second compartments and extending across said central wall means, gasket means surrounding each said aperture, plural elongated solar collectors each comprising a closed end, double wall tubular member having an open end in sealing engagement with said gasket means, the outer wall of said tubular member being glass and the inner wall of said member being spaced from the outer wall, a peripheral surface of the inner wall having an energy absorbing surface extending substantially the length of the tubular member, the outer and inner walls being integrally connected adjacent the open end of said member sealing the space therebetween, said sealed space being evacuated to subatmospheric pressure, the open end of each said double wall tubular member in said aperture being connected with both said first and second compartments of the manifold, an elongated dividing strip axially disposed internally of said tubular member and spaced from the closed end of the latter, and sealingly connected with the internal wall as an extension thereof, whereby the first and second compartments of the manifold are connected to each of the tubular members on opposite sides of the dividing strip, the first and second compartments of the manifold being connected to each other in the tubular members adjacent the closed end thereof, a gas filling both compartments of said manifold, and the tubular members, and means for propelling said gas in said manifold from one compartment thereof through the tubular members and into the other compartment of the manifold.

17. The solar energy collection apparatus of claim 16, which includes a heat insulating material surrounding all exposed surfaces of said manifold.

18. The solar energy collection apparatus of claim 17, wherein said manifold further includes opposed side walls and top and bottom walls connected thereto, defining a rectilinear hollow duct which is divided centrally into first and second compartments disposed one over the other by said longitudinal internal wall, said plural double walled tubular members being disposed in plural apertures along one of said side walls in spaced apart array.

19. The solar energy collection apparatus of claim 18, wherein said plural double walled tubular members are disposed in plural apertures along both of said side walls depending on opposite longitudinal sides of said manifold in spaced apart array thereat.

20. A solar energy collection apparatus comprising an elongated hollow manifold comprising an exterior wall means and interior wall means, said exterior wall means defining a hollow duct and said interior wall means dividing said duct into separate plural longitudinal compartments, plural aperture means spaced longitudinally along said exterior wall means, each said aperture communicating with two adjacent ones of said plural compartments, an elongated solar collector sealingly end connected in said aperture means and depending outwardly from said manifold wall, said solar collector comprising a closed end, double wall tubular member having an open end thereof in one of said aperture means of the manifold, the outer wall of said member being glass and the inner wall spaced therefrom, a peripheral surface portion of the inner wall having an energy absorbing surface substantially spanning the length of the tubular member, the outer and inner walls thereof being integrally connected adjacent the open end of said member sealing the space therebetween, said space being under a vacuum, said open end of the member communicating with each of said two adjacent compartments along the side of the manifold from which said member depends, a gas filling said manifold compartments and said tubular collector members, an elongaged dividing strip means in each said tubular collector member connected to said manifold interior wall means and axially disposed internally of the inner wall of said collector member, the inner end thereof being spaced from said closed end of the member, whereby one of the manifold compartments of said two adjacent ones is connected to the tubular collector member for flow of gas into the tubular collector and along one side of the dividing strip means therein and along the other side of said strip means and out of the tubular collector and into the other of the manifold compartments of said two adjacent ones, a layer of heat insulating material surrounding said exterior wall means of the manifold, and means propelling said gas in said manifold for flow from one compartment of said two adjacent compartments through the tubular collector members connected thereto and into the other compartment of said two adjacent compartments.

21. The solar energy collection apparatus of claim 20, wherein said plural manifold compartments comprise four longitudinal compartments of said plural aperture means in said manifold are spaced along opposite sides of the manifold, whereby the tubular collector members depend outwardly from opposite sides of the manifold.

* * * * *

UNITED STATES PATENT OFFICE
CERTIFICATE OF CORRECTION

PATENT NO. : 4,016,860
DATED : April 12, 1977
INVENTOR(S) : Kenneth L. Moan

It is certified that error appears in the above-identified patent and that said Letters Patent are hereby corrected as shown below:

Col. 1, line 48, after "may" insert --be--.

Col. 3, line 4, "gasked" should be --gasket--.

Col. 6, lines 31-32, delete "thereby detachably connecting the web means to the manifold,".

Signed and Sealed this twenty-third Day of August 1977

[SEAL]

Attest:

RUTH C. MASON
Attesting Officer

C. MARSHALL DANN
Commissioner of Patents and Trademarks